United States Patent
Hashimoto et al.

(10) Patent No.: US 6,181,096 B1
(45) Date of Patent: Jan. 30, 2001

(54) ROBOT CONTROLLING SYSTEM

(75) Inventors: Yoshiki Hashimoto, Kanagawa; Yoshiyuki Kubo; Yasuyuki Shimoda, both of Yamanashi, all of (JP)

(73) Assignee: Fanuc Ltd., Yamanashi (JP)

( * ) Notice: Under 35 U.S.C. 154(b), the term of this patent shall be extended for 0 days.

(21) Appl. No.: 09/336,705

(22) Filed: Jun. 21, 1999

(30) Foreign Application Priority Data

Jun. 19, 1998 (JP) .................................................. 10-189873

(51) Int. Cl.$^7$ .................................................. G05B 19/19
(52) U.S. Cl. ...................................... 318/568.11; 318/560
(58) Field of Search .................................. 318/560, 567, 318/568.11, 568.12, 618, 671, 677

(56) References Cited

U.S. PATENT DOCUMENTS

| | | | |
|---|---|---|---|
| 4,855,657 | * 8/1989 | Isobe et al. ........................... | 318/602 |
| 5,055,754 | * 10/1991 | Kishi et al. ........................... | 318/565 |
| 5,200,678 | * 4/1993 | Tokashiki et al. .............. | 318/568.13 |
| 5,241,250 | * 8/1993 | Nagasawa et al. .................. | 318/591 |
| 5,341,078 | * 8/1994 | Torii et al. ....................... | 318/568.22 |
| 5,349,277 | * 9/1994 | Takahashi et al. .............. | 318/568.12 |
| 5,493,192 | * 2/1996 | Nihei et al. ....................... | 318/568.2 |

* cited by examiner

Primary Examiner—Robert E. Nappi
Assistant Examiner—Rina I. Duda
(74) Attorney, Agent, or Firm—Staas & Halsey, LLP (57) ABSTRACT

In a robot controlling system including a robot unit having a robot arm and a servomotor into which the robot ann is incorporated, a servo amplifier unit to drive the servo motor, and a controlling unit to control the robot arm by sending commands to the servo amplifier unit, and transmit-receive means between the controlling unit and the robot unit is incorporated into transmit-receive means between the controlling unit and the servo amplifier unit as well as into trasmmit-receive means between the servo amplifier unit and the robot unit, transmission and reception between the controlling unit and the robot unit is conducted via the servo amplifier unit. A command to be sent from the controlling unit to the robot unit as well as communication on feedback signals and detection signals to be sent from the robot unit to the controlling unit is conducted via the servo amplifier unit, which as a result may serve to make it possible to omit cables connecting between the control unit and the robot unit, and to decrease in terms of kinds of length of cables and number of cables to be prepared to comply with placement conditions of the controlling unit, the servo amplifier unit, and the robot unit.

10 Claims, 3 Drawing Sheets

ROBOT CONTROLLING SYSTEM

BACKGROUND OF THE INVENTION (1) Field of the Invention

The present invention relates to a system to control an industrial robot (hereinafter referred to simply as a "robot").

(2) Description of the Prior Art

Figure 5:
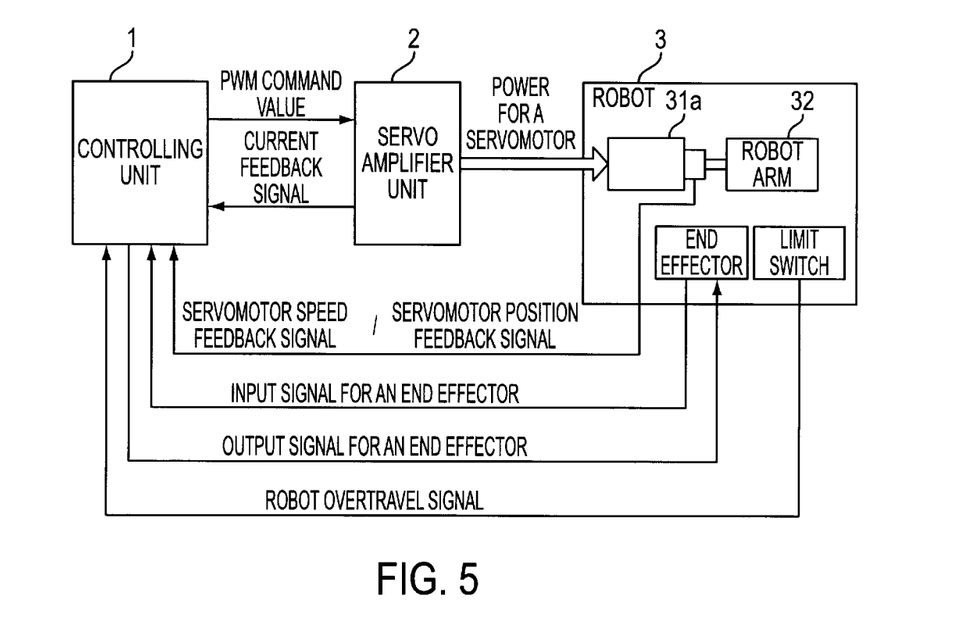
FIG. 5 is a schematic block diagram to explain the controlling of the conventional robot

A robot normally comprises a robot arm into which a servomotor has been incorporated, and the said servomotor is driven by a servo-amplifier unit. The control of the robot is performed by aiving commands to the servo-amplifier unit by a controlling device. FIG. 5 is a schematic block diagram to explain the conventional robot control. Incidentally, in FIG. 5 a robot in a form shown in Japanese Patent Application Laid-Open No.8-11074 specification for example is shown as an example of the conventional robot.

A controlling unit 1 controls a servo amplifier unit 2, and, based on the control the servo amplifier unit 2 supplies a power to a servomotor 31 of a robot unit 3. The servomotor 31 is incorporated into every robot arm 32, and controlled by the controlling unit 1 via the servo amplifier unit 2.

Between the controlling unit 1 and the servo amplifier unit 2, the controlling unit 1 sends a PWM command to the servo amplifier unit 2 and obtains a current feedback value from the servo amplifier unit 2. In addition, between the controlling unit 1 and the robot 3, the controlling unit 1 outputs an output for an end effector to the robot 3 and inputs a servomotor speed feedback signal, a servomotor position feedback signal an end effector input signal and a robot overtravel signal from the robot 3.

The controlling unit 1 conducts current control of a servo motor system based on the current feedback value, and speed control or position control of the servomotor system based on the servomotor speed feedback signals or the servomotor position feedback signls. In addition, by input and output signals for the end effector, control of every kind of function which the robot comprises is conducted by a robot overtravel signal whereby an over movement of the robot arm is detected.

In addition, Japanese Patent Application Laid-Open No.8-229862 discloses placing a servo amplifier in the vicinity of a motor mounted on a body of the robot for the purpose of making wiring of power cables shorter.

There is a problem in the conventional robot control systems that for the purpose of conducting transmission and reception of every kind of signal such as controlling signals, feedback signals, detection signals, et wiring between the robot and the servo amplfer unit, the servo amplifier unit and the controlling unit, and the robot and the controlling unit becomes necessary, resulting in an increase in the number of wiring.

In addition, in the case where the control unit is placed at a position far from the robot as well as the servo amplifier unit, it is necessary to extend two cables, namely the cable connecting the controlling unit and the servo amplifier unit and the cable connecting the controlling unit and the robot. In the conventional configurations, each time when a controlling unit is placed at a different position, as such a cable connecting the controlling unit and the servo amplifier unit and the cable connecting the controlling unit and the robot, it is necessary to prepare a plural kinds of cables having lengths corresponding to the position of a controlling unit to be placed.

Therefore, in the conventional robot controlling systems, there are problems in terms of the number of wirings, the number of extension cables, kinds of lengths in stock cables. An increase in the number of wiring as well as the number of kinds and units, etc. of extension cables to be deployed in advance causes an increase in costs and wirng work, resulting in a troublesome control in cables and wiring inside cables. Also there are problems in terms of appearance of covering of wiring.

In addition, in the previously described well known example (Japanese Patent Application Laid-Open No.8-229862), wiring of power cable gets shorter. Nevertheless, as concerns wiring for transmitting servomotor speed and position feedback signals, input and output signals for an end effector, and robot overtravel signals no consideration has been given to shorten wiring

OBJECTS AND SUMMARY OF THE INVENTION

An object of the present invention is to solve the conventional problems and decrease the number of wirings, kinds of cable lengths and their quantity in the robot controlling system.

The servo controlling system of the present invention is configured to comprise a robot unit including a robot arm and a servomotor, a servo amplifier unit to drive the servomotor, and a controlling unit to control the robot arm by sending commands to the servo amplifier unit, and transmission and reception means between the controlling unit and the robot unit is conducted via the servo amplifier unit with transmit-receive means between the controlling unit and the robot unit being incorporated into transmit-receive means between the controlling unit and the servo amplifier unit and into transmit-receive means between the servo amplifier unit and the robot unit in the robot controlling system.

A command to be sent from the control unit to the robot unit as well as communication on feedback signals and detection signals to be sent from the robot unit to the controlling unit are conducted in use of transmit-receive means between the controlling unit and the servo amplifier unit as well as transmit-receive means between the servo amplifier unit and the robot unit via the servo amplifier unit.

This configuration serves to make it possible to omit transmit-receive means such as conventionally required cables, etc to attain connection between the controlling unit and the robot unit, and thus to decrease the number of cables.

In addition, to correspond to the systems different in deployment condition, such as respective deployment positions of the controlling unit, the servo amplifier unit, and the robot unit, corresponding treatments only for transmit-receive means between the controlling unit and the servo amplifier unit will do. In the cases where cables are used as the said transmit-receive means, no cables between the controlling unit and the robot unit are required, and adjustment only on cables in the controlling unit and the servo amplifier unit will do, thus making it attainable to decrease the kinds of cable lengths of cables to be prepared.

In addition the transmit-receive means between the controlling unit and the servo amplifier unit is to be configured to comprise communication means, and for the transmission and reception between the controlling unit and the robot unit, the transmission and reception between the controlling unit and the servo amplier unit is conducted through the communication means. By implementing this configuration, a plurality of kinds of transmission and reception between the controlling unit and servo amplifier unit can be performed through only a signal conductor accommodated to the communication types, without using cables each required for every type of a signal, thus maliing it possible to decrease the number of cables to be wired.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
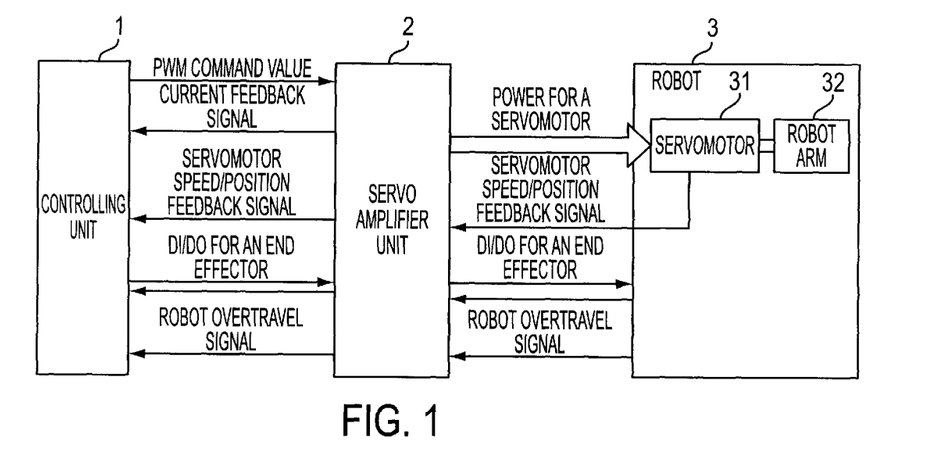
FIG. 1 is a block diagram showing a configuration example of a servo controlling system of the present invention.

FIG. 1 is a block diagram showing a configuration example of the servo controlling system of the present invention. The controlling unit 1 controls the servo amplifier unit 2, and, the servo amplifier unit 2 supplies a power to the servomotor 31 of the robot unit 3 based on the control The servo motor 31 is incorporated into every robot arm 32, and controlled by the controlling unit 1 via the servo amplifier unit 2

The controlling unit 1 sends a PWM command to the servo amplifier unit 2. The servo amplifier unit 2 supplies a drive current to the servo motor 31 of the robot unit 3 via an power line for the servo motor based on the said PWM command. For the control of this servo motor 31, the servo amplifier unit 2 feeds back a current feedback value to the control unit 1, and feeds back to the controlling unit 1 a speed feedback signal or a position feedback signal of the servo motor which are received from the servo motor 31.

In addition, the controlling unit 1 sends to the robot unit 3 via the servo amplifier unit an output signal for an end effector to operate end effectors such as hands of the robot unit 3, etc. In addition, the robot unit 3 sends to the controliing unit 1 via the servo amplifier unit 2 an input signal for the end effector to notify the performance status of the end effector as well as a robot overtravel signal to notify the over movement of a robot arm.

Thereby tihe transmission and receipt of a PWM command, a current feedback signal, a speed feedback signal, or a position feedback signal, an input signal for an end effect or, an output signal for an end effector, and a robot overtravel signal are conducted between the controlling unit 1 and the servo amplifier unit 2 and the transdssion and receipt of a drive current, a servo motor speed feedback signal or a position feedback signal, an input signal for an end effector, an output signal for an end effector, and a robot overtravel signal are conducted between the servo amplifier unit 2 and the robot unit 3.

Therefore, the transmission and receipt of signals to be conducted between tle controlling unit 1 and the robot unit 3 are to be conducted via the servo amplifier unit 2.

Figure 2:
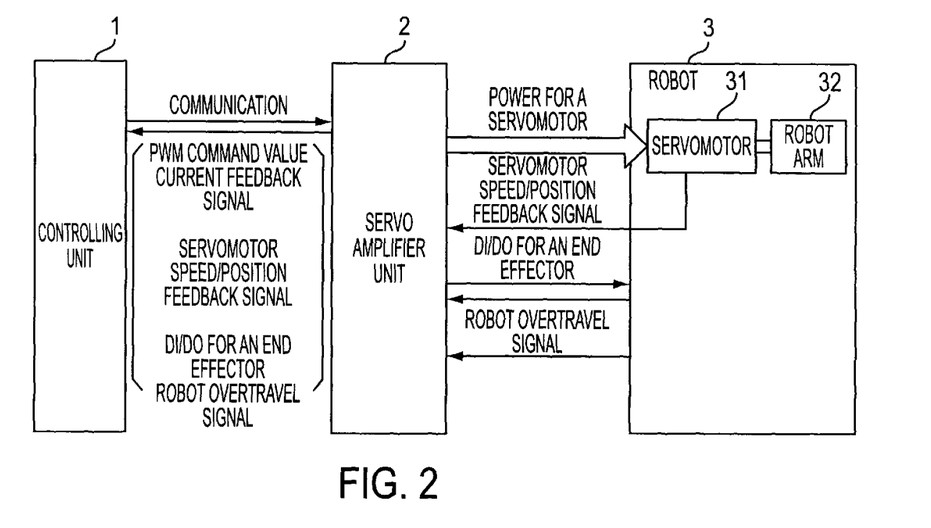
FIG. 2 is a block diagram in the case where communication connection is provided between the controlling unit and the servo amplifier unit of the present invention.

Incidentally, the transmission and receipt of signals between the controlling unit 1 and the servo amplifier unit 2 can be conducted through communication without using any cables. FIG. 2 is a block diagram in the case where communication connection is provided between the controlling unit 1 and the servo amplifier unit 2. In FIG. 2, the configuration of the controlling unit 1, the servo amplifier unit 2, and the robot unit 3 as well as connection between the servo amplifier unit 2 and the robot unit 3 constitute a configuration similar to that shown in FIG. 1 but dissimilar to that shown in FIG. 1 on the point that the connection between the controlling unit 1 and the servo amplifier unit 2 is implemented by way of communication.

In the case where communication is adopted, the controlling unit 1 as well as the servo amplifier unit 2 respectively comprise the transmit-receive controlling circuits, and the control of bidirectional communication is implemented in accordance with a predetermined communication protocol.

Transmission of signals from the controlling unit 1 to the servo amplifier unit 2 as well as from the servo amplfier unit 2 to the controlling unit 1 is conducted by bidirectional communication to be conducted between the control unit 1 and the servo amplifier unit 2. The bidirectional communication can be configured to use lines respectively assigned for the forward way and the return way and also can be configured to share the same line for the forward way and the return way.

In addition, it is applicable to any of transmission methods of full duplex which conduct multiplexing of bidirectional signals to proceed with transmission simultaneously, or half-duplex which divides time to proceed with unidirectional transmission alternately.

In addition, it is applicable to any form of transmission of serial transmission to be operated with a single line and parallel transmission to be operated with plurality of lines in terms of a number of data lines to be provided in the controlling unit 1 and the servo amplifier unit 2.

Therefore, according to the controlling system of the present invention, cables between the controlling unit 1 and the robot unit 3 can be omitted, and in the case where the communication between the controlling unit 1 and the servo amplifier unit 2 is conducted by serial transmission, the number of cables to be disposed can be decreased into one, resulting in further decrease in the quantity of cables.

Figure 3:
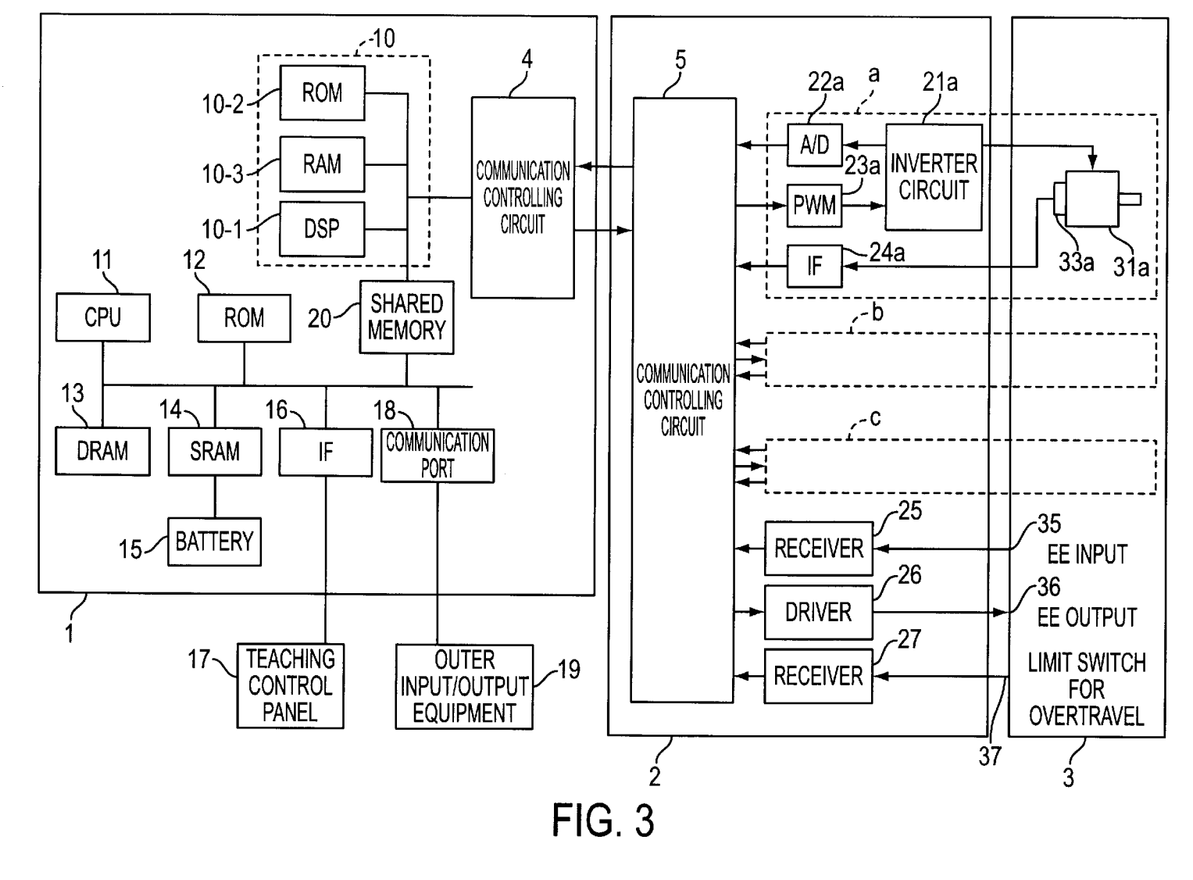
FIG. 3 is a schematic block diagram explaining a configuration example of each part in a controlling system of the present invention.

Next, the configuration of each unit in the controlling system of the present invention will be explained by using FIG. 3.

The control unit 1 has a central processing unit (CPU)11, and to the CPU 11 memories such as ROM 12, DRAM 13, and SRAM 14, etc. are connected via buses. Incidentally, SRAM 14 configures a nonvolatile memory with backup of a battery 15. In addition, to a bus, an instruction operation panel 17 is connected via an interface 16, and an outside input/output equipment 19 is connected via communication port 18 (or a general-purpose interface). Display means such as a liquid crystal display, etc. can be provided in the teadhing control panel 17. Incidentally, as the outer input/ output equipment 19, those such as a hand, a conveyer, a work box switching equipment, a spot gun, an alarm lamp, a buzzer, and an off-line programming equipment, etc. can be used.

In the ROM 12 various programs are stored so that CPU 11 may conduct control of the robot unit 3 and the controlling unit 1 itself. The DRAM 13 is a memory to be used for temporal memorization as well as operation of data. In the nonvolatile memory of the SRAM 14, various parameter set points as well as program data are stored by manual input from the teaching control panel 17 or off-line input to be conducted via the communication port 18 or a general-purpose interface.

In addition, to the CPU 11 a robot pivot controlling unit 10 is connected via a shared memory 20. To the robot axis control unit 10 a digital signal processor (DSP) 10-1, a ROM 10-2, a RAM 10-3, and a communication controlling circuit 4 is connected via a bus. The DSP 101 is a processor to solely control a robot axis, and the ROM 10-2 is a memory to store a program to conduct control of the robot axis, and the RAM 10-3 is a memory solely for the DSP to store the processed data and set parameters attained by the DSP 10-1.

The communication controlling circuit 4 exchanges signal transmission with the transmission controlling circuit 5 at the party of the servo amplifier unit 2. From the party of controlling unit 1 to the party of servo amplifier unit 2, command signals for the PWM and the like for axis control which have been processed in the robot axis controlling unit 10, and signals such as of an output for an end effector, etc. are sent.

The servo amplifier unit 2 comprises a communication controlling circuit 5, parts 21a, 22a, 23a, and 24a which conduct control of power supply to the servomotor 31a of the robot unit 3, receivers 25 and 27, and a driver 26.

In addition, the robot unit 3 comprises a servomotor 31a incorporated in each robot arm, detector 33a to detect the rotation status such as speed and position, etc. of the servomotor 31a, an end effector input terminal 35 related to end effector such as hand, and an end effector output terminal 36, and a limit switch 37 for over travel and the like.

The communication controlling circuit 5 of the servo amplifier unit 2 is a unit to exchange signal transmission with the controlling unit 1, and receives from the controlling unit 1 signals such as PWM command signals, and signals for output for the end effector, or the like, and sends to the control unit 1 signals such as current feedback signals, servomotor's speed/position feedback signals, and signals for input for the end effector, and robot overtravel, etc.

Here, a portion, namely a portion enclosed by dotted lines "a" in FIG. 3, which controls power supply to one servomotor 31a based on signals having been transmitted from the controlling unit 1, will be explained below.

The PWM controlling unit 28a controls currents in an inverter circuit 21a based on a PWM command to form the driving current, and the inverter circuit 21a supplies the drive currents to the servomotor 31a. In addition, an A/D conversion circuit 22a digitally converts the current feedback values of currents to be supplied to the servomotor 31a, and thereafter to be sent to the transmission controlling circuit 5. In addition, from the detector 33a speed feedback signals or position feedback signals are sent to the communication controlling circuit 5 via the interface 24a.

For other servomotors (not shown), a controlling operation similar to control of power supply to be applied to the servomotor 31a as well is conducted. FIG. 3 shows a portion, which controls power supply to these other servomotors based on signals having been transmitted from the controlling unit 1, being enclosed by dotted lines "b" and "c". Accordingly, as shown by dotted lines "a", "b", and "c" in FIG. 3, power supply is controlled for each servomotor.

The communication controlling circtut 5 of the servo amplifier unit 2, transmits to the controlling unit 1 via the communication controlling circuit 4 of the controlling unit 1 feedback values of currents to be supplied to each servomotor 31a, and the outputs speed feedback signals or position feedback signals from position or speed detectors 33a attached to each servomotor.

In the servo amplifier unit 2, the receiver 25 receives signals from the end effector input terminal 35 of the robot unit 3 to send them to the communication controlling circuit 5, while the receiver 27 receives signals from the limit switch 37 for overtravels of the robot unit 3 to send them to the communication controlling circuit 5. In addition, the driver 26 sends an output for the end effector from the communication controlling circuit 5 toward the end effector output terminal 36 of the robot unit 3.

Accordingly, the communication controlling circuit 5 of the servo amplifier unit 2 acts as a repeater of speed feedback signals or position feedback signals, and each of input signals for end effector as well as overtravel signals from the robot unit 3 to the controlling unit 1, and acts as a repeater of output signals for end effector from the controlling unit 1 to the robot unit 3, and thus wiring and cables between the controlling unit 1 and the robot unit 3 can be omitted.

Figure 4:
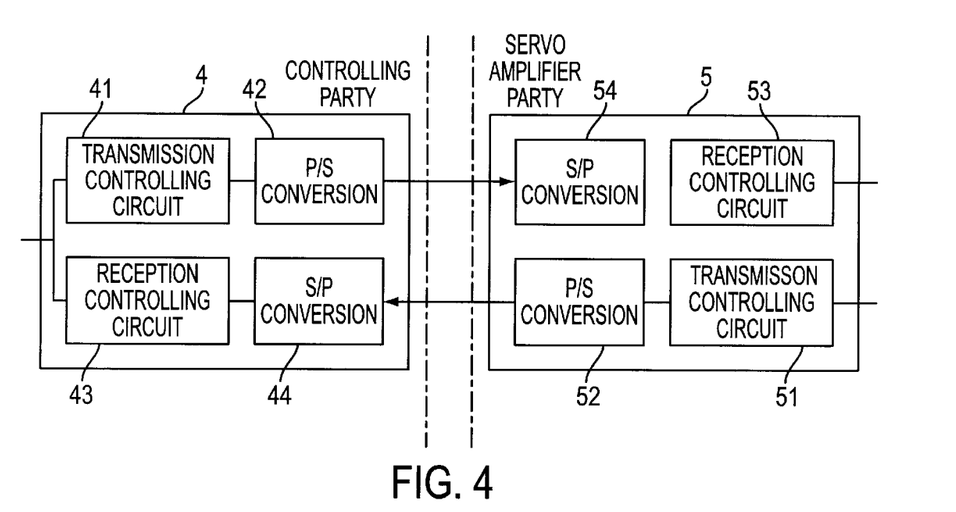
FIG. 4 is a block diagram explaining a configuration example of a communication controlling circuit of the present invention.

FIG. 4 is a block diagram explaining an example of configuration of a communication controlling circuits 4 and 5 and shows the case of bidirectional commumcation which is congured to use respective lines for the forward way and the return way, In the communication controlling circuit 4, transmission is configured by the transmission controlling circuit 41 and the P/S (parallel/serial) conversion circuit 42, and serial signals are transmitted to the communication controlling circuit 5. In addition, reception is configured by the S/P (serial/parallel) conversion circuit 44 and the reception control circuit 43, and signal processing is conducted in a signal form of parallel signals.

In addition, in the communication controlling circuit 5, transmission is configured by the transmission controlling circuit 51 and the P/S parallel/serial) conversion circuit 52, and serial signals are transmitted to the communication controlling circuit 4. In addition, reception is confined by the S/P (serial/parallel) conversion circuit 54 and the reception control circuit 53, and signal processing is conducted in a signal form of parallel signals.

Incidentally, in the configuration of FIG. 4, an example making communication in a signal form of serial signals is shown, however, in the case where the parallel signal line is disposed between the communication controlling circuit 4 and the communication controlling circuit 5, configuration with an omission of P/S conversion circuit and S/P conversion circuit can be adopted.

As explained above, according to the present invention, in the robot controlling system, the decrease in terms of quantity of wiring, kinds of length of cables and number of cables can be attained.

What is claimed is:

1. A robot controlling system, comprising:

a robot unit including a robot arm and a servomotor;

a servo amplifier unit to drive said servomotor; and a controlling unit to control said robot arm by sending commands to said servo amplifier unit, wherein transmission and reception between said controlling unit and said robot unit is conducted via said servo amplifier unit with a transmit-receive unit between said controlling unit and said robot unit being incorporated into a transmit-receive unit between said controlling unit and said servo amplifier unit as well as into a transmit-receive unit between said servo amplifier unit and said robot unit in said robot controlling system.

2. The robot control system according to claim 1, wherein said transmit-receive unit between said controlling unit and said servo amplifier unit comprises a communication unit.

3. A robot controlling system, comprising:

a robot unit including a robot and servomotors to drive each axis of said robot;

a servo amplifier unit to control power supply to said respective servomotors; and a controlling unit to send commands for controlling said robot to said servo amplifier unit, wherein both of said servo amplifier unit and said controlling unit comprise communication controlling circuits respectively, and connection to and from both of said communication controlling circuit is implemented with communication lines, and said servo amplifier unit comprises:

an interface to receive output signals from a position or speed detector connected to said servomotors and send them to a communication controlling circuit of said servo amplifier unit;

a receiver to receive outputs from an end effector of said robot and send them to said communication controlling circuit of said servo amplifier unit;

a driver to receive signals for said end effector from said communication controlling circuit and send them to the end effector of said robot.

4. A robot controlling servo amplifier system allowing control of a robot from a controller, comprising:

a controller controlling a robot arm on the robot by sending commands to an amplifier unit;

the amplifying unit comprising:

a receiver receiving signals from the controller to the amplifier unit; and a transmitter transmitting the received signals from said amplifier unit to the robot, wherein all signals between the controller and the robot are received in the receiver and transmitted in the transmitter.

5. A robot controlling servo amplifier system allowing control of a robot from a controller, comprising:

a controller controlling a robot arm on the robot by sending commands to an amplifier unit;

the amplifying unit comprising:

a receiver receiving signals from the controller to the amplifier unit; and a transmitter transmitting the received signals from said amplifier unit to the robot, wherein control signals between the controller and the robot are received in the receiver and transmitted in the transmitter.

6. The amplifying unit as recited in claim 5, wherein the control signals include a current feedback signal.

7. The amplifying unit as recited in claim 5, wherein the control signals include a speed/position feedback signal.

8. The amplifying unit as recited in claim 5, wherein the control signals include an end effector signal.

9. The amplifying unit as recited in claim 5, wherein the control signals include a robot overtravel signal.

10. A robot controlling system, comprising:

a robot unit including a robot arm and a servomotors;

a servo amplifier unit to drive said servomotor;

a controlling unit to control said robot arm by sending commands to said servo amplifier unit;

a receiver receiving signals sent from said controlling unit to said servo amplifier unit; and a transmitter transmitting said received signals from said amplifier unit to said robot unit, wherein all transmission and reception between said controlling unit and said robot unit is conducted via said transmitter and said receiver.

* * * * *

UNITED STATES PATENT AND TRADEMARK OFFICE
CERTIFICATE OF CORRECTION

PATENT NO. : 6,181,096 B1
DATED : January 30, 2001
INVENTOR(S) : Yoshiki Hashimoto It is certified that error appears in the above-identified patent and that said Letters Patent is hereby corrected as shown below:

Title page,
Item [57] ABSTRACT,
Line 2, change "ann" to -- arm --;
Line 9, change "trasmmit" to -- transmit --.

Column 1,
Line 12, change "aiving" to -- giving --;
Line 13, after "device." start a new paragraph;
Line 30, after "signal" (1st and 2nd occurrences) insert a comma -- , --;
Line 48, after "signal" insert a comma -- , --;
Line 49, change "et" to -- etc. --;
Line 63, after "prepare" delete [a].

Column 2,
Line 45, change "etc" to -- etc. --;
Line 47, delete [the] before "systems";
Line 58, add a comma -- , -- after "In addition".

Column 3,
Line 2, change "maliing" to -- making --;
Line 32, after "control" insert a period -- . --;
Line 35, after "unit 2" insert a period -- . --;
Line 38, change "via an" to -- via a --;
Line 50, change "controling to -- controlling --;
Line 54, change "tihe" to -- the --;
Line 57, change "effect or" to -- effector --;
Line 59, change "unit 2" to -- unit 2, --; change "transdssion" to -- transmission --;
Line 66, change "tle" to -- the --.

Column 4,
Line 58, change "teadhing" to -- teaching --.

Column 5,
Line 9, change "DSP101" to -- DSP10-1 --;
Line 63, change "circtut" to -- circuit --.

UNITED STATES PATENT AND TRADEMARK OFFICE
CERTIFICATE OF CORRECTION

PATENT NO.   : 6,181,096 B1
DATED        : January 30, 2000
INVENTOR(S)  : Yoshiki Hashimoto It is certified that error appears in the above-identified patent and that said Letters Patent is hereby corrected as shown below:

Column 6,
Line 24, change "commumcation" to -- communication --;
Line 25, change "congured" to -- configured --;
Line 26, change "way" to -- way. --.
Line 37, after "P/S" insert a left parenthesis (before "parallel/serial");
Line 43, change "configuation" to -- configuration --;
Line 63, delete "a transmit-receive unit";
Line 64, delete "between said controlling unit and said robot unit";
Line 65, delete "being incorporated into"; and
Line 67, change "as well as into" to -- and --.

Column 8,
Line 26, change "servomotors" to -- servomotor --.

FIG. 5 -- add -- Prior Art -- (See attached drawing).

Signed and Sealed this

Eighteenth Day of December, 2001

Attest:

JAMES E. ROGAN
*Attesting Officer*   *Director of the United States Patent and Trademark Office*

FIG. 4

Prior Art

FIG. 5